United States Patent [19]
Aoki et al.

[11] 4,348,226
[45] Sep. 7, 1982

[54] DIRECT REDUCTION PROCESS FOR PRODUCING METALLIC IRON

[75] Inventors: Mamoru Aoki; Masahiro Tomita; Kei Utsunomiya, all of Kobe; Hironobu Sako, Yokohama; Dentaro Kaneko, Kobe; Katsunori Shimazaki, Kobe; Yoshitomo Ishii, Kobe, all of Japan

[73] Assignee: Kobe Steel, Ltd., Kobe, Japan

[21] Appl. No.: 186,131

[22] Filed: Sep. 11, 1980

[30] Foreign Application Priority Data

Sep. 11, 1979 [JP] Japan ................................. 55-116801

[51] Int. Cl.³ ........................................... C21B 13/02
[52] U.S. Cl. ........................................... 75/35; 266/156
[58] Field of Search ............................. 75/35; 266/156

[56] References Cited
U.S. PATENT DOCUMENTS

| | | | |
|---|---|---|---|
| 4,048,091 | 9/1977 | Barnaba | 75/35 |
| 4,099,963 | 7/1978 | MacKay | 75/35 |
| 4,268,303 | 5/1981 | Kaneko et al. | 75/35 |

Primary Examiner—M. J. Andrews
Attorney, Agent, or Firm—Oblon, Fisher, Spivak, McClelland & Maier

[57] ABSTRACT

A process for the direct reduction of iron oxide by blowing into a reduction furnace a reducing gas which is prepared by reforming a mixture of a reduction furnace exhaust gas and a gas mainly composed of methane, which comprises the steps of dividing the gas mainly composed of methane into two branch streams, mixing the first branch stream gas with a part of the reduction furnace exhaust gas and supplying the resulting mixture to the externally heated reformer furnace, to produce a high-temperature reformed gas; mixing the second branch stream gas with said high-temperature reformed gas and during the course to the reduction furnace, subjecting the mixture to endothermic reforming reactions in an after-reactor without external heating, utilizing the sensible heat of the high-temperature mixed gas, controlling the self-reforming reactions so as to lower the temperature and simultaneously adjust the composition of the high-temperature mixed gas, and blowing the reducing gas obtained into the reduction furnace. Effective use of the sensible heat can be achieved.

12 Claims, 5 Drawing Figures

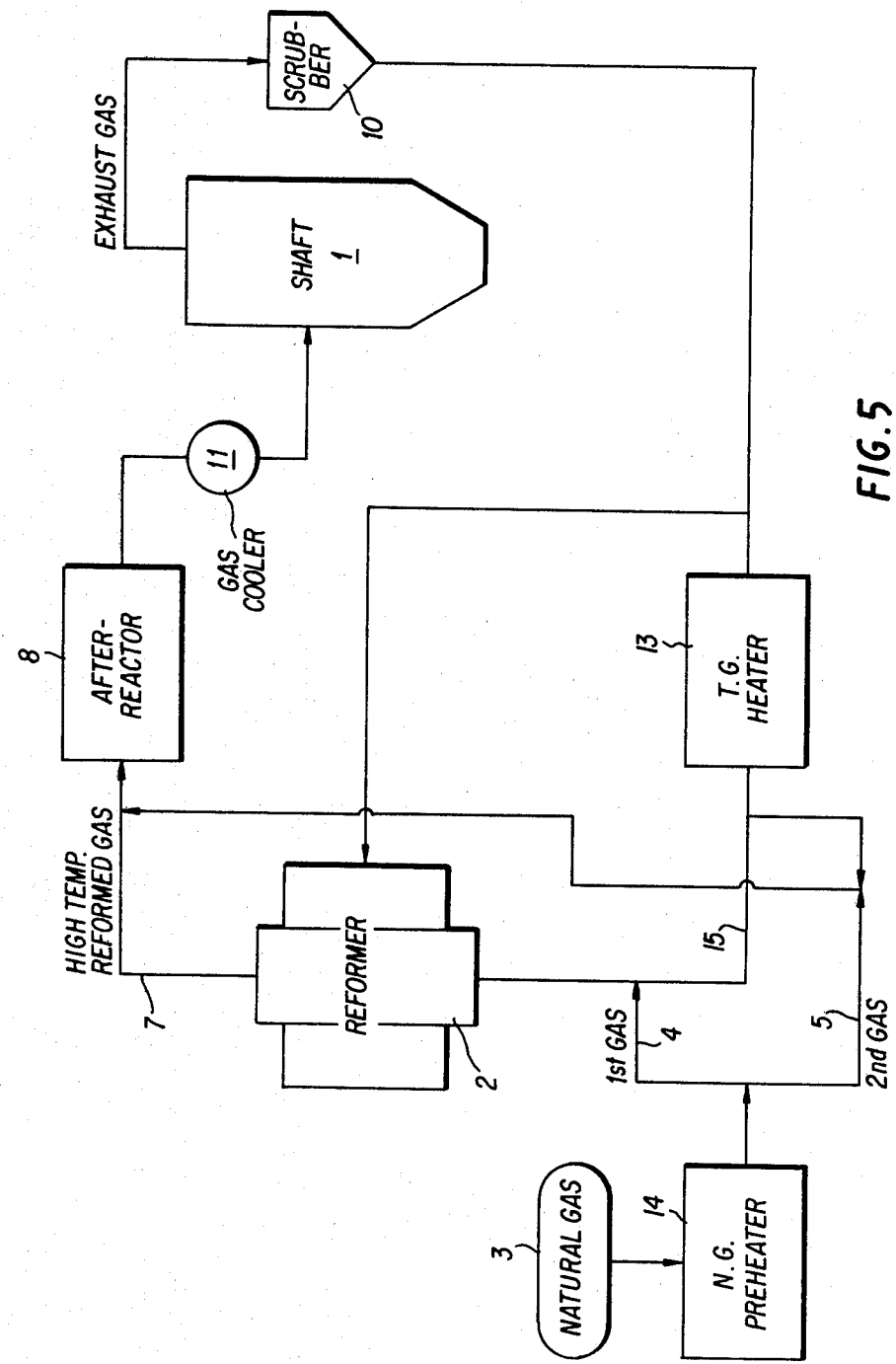

DIRECT REDUCTION PROCESS FOR PRODUCING METALLIC IRON

BACKGROUND OF THE INVENTION

1. Field of the Invention

This invention relates to a method for the direct reduction of iron oxide materials, such as iron ore pellets, to solid metallic iron with a reducing gas.

2. Description of the Prior Art

Direct-reduction processes for iron manufacture have been spotlighted as small-scale iron manufacturing techniques, especially in developing countries.

Among them, known as the direct-reduction processes to be carried out in vertical shaft type furnaces are the Midrex process (e.g. U.S. Pat. Nos. 3,748,120, 3,764,123 and 3,617,227), the Armco process (e.g. U.S. Pat. Nos. 3,558,118 and 3,850,616) the Purofer process (e.g. U.S. Pat. Nos. 3,883,123 and 3,948,646), Nippon Steel Process (U.S. Pat. No. 4,001,010) and so forth.

In these processes, gases mainly composed of methane, such as a natural gas, are used for preparing gaseous reductants by reforming the gases in a reformer furnace. The reducing gases produced in the reformer furnace as a result of reactions involved in the reforming generally have relatively high temperatures exceeding 900° C. which are too high for the gases to be blown into a reduction furnace, especially a vertical shaft type one. Therefore, in the prior art, the high-temperature gases produced in the reformer are subjected either to cooling and temperature control in a gas cooling apparatus or the like, or to cooling and temperature control by adding a cooled exhaust gas from the reduction furnace, for instance. It is a problem to be solved that the measures for the cooling and temperature control result in loss in the sensible heat of the reducing gas or in degradation of the reducing power of the reducing gas.

SUMMARY OF THE INVENTION

Therefore, it is an object of the invention to provide a method by which the above-mentioned problem in the direct-reduction processes for iron manufacture in vertical shaft type furnaces can be solved.

Thus, an object of the invention is to provide a method to be employed in the direct-reduction processes for reducing iron oxide by blowing into a reduction furnace a reducing gas prepared by mixing a gas mainly composed of methane with a reduction furnace exhaust gas, by which method the sensible heat of the high temperature reformed gas formed in a reformer furnace can be used effectively.

Another object of the invention is to provide a method of effectively utilizing said sensible heat by mixing a gas mainly composed of methane with the high temperature reformed gas and thereby causing endothermic self-reforming reactions to proceed, by virtue of the sensible heat, whereby the temperature and composition of the reducing gas are controlled through said reactions.

A further object is to provide a method for the direct reduction of iron oxide which can reduce the load on the reformer furnace by making use of the said self-reforming reactions and which is advantageous from the viewpoint of heat economy in that the sensible heat can be utilized.

A still further object is to provide a method of producing a reducing gas in a steady manner while eliminating as much as possible the possibility of dangerous deposition of carbon in the reformer furnace.

The present invention which can achieve the above and other objects consists in an improvement in a method for the iron manufacture by a direct-reduction process in a vertical shaft type furnace wherein, as schematically shown in FIG. 1, a gas (3) mainly composed of methane, such as a natural gas, is reformed by using $CO_2$ and $H_2O$ in a reduction furnace exhaust gas as the oxidizing agents and the resulting reducing gas is blown into a reduction furnace (1), said improvement being in principle characterized in that the gas (3) mainly composed of methane and to be reformed is divided into two branch or partial streams, the first branch stream gas (4) being mixed with a part (6) of the reduction furnace exhaust gas and the mixture is supplied to an externally heated reformer furnace (2) so as to produce a high-temperature reformed gas (7), that the second branch stream gas (5) is mixed with the high-temperture reformed gas (7) and the mixture is subjected, during the course to the reduction furnace, to reforming reactions, which are endothermic, in an after-reactor (8), which is not heated externally, utilizing the sensible heat of said high-temperature reformed gas, so that the temperature of the high-temperature reformed gas from the reformer furnace is lowered and at the same time the gas composition is adjusted, and that the reducing gas (9) thus obtained is blown into a reduction furnace.

In accordance with a preferred embodiment of the invention, the reduction furnace exhaust gas is preliminarily heated to 800° C. or above and the so-heated reduction furnace exhaust gas is mixed with the first branch stream gas at a temperature lower than that of said reduction furnace exhaust gas, and the resulting gas mixture at a temperature of 705°–850° C. is supplied to the reformer furnace. For this purpose, it is desirable to preheat the first branch stream gas to 500°–600° C. prior to the mixing.

In accordance with another preferred embodiment, the second branch stream gas is first mixed with another part of the reducing furnace off-gas, the mixture is then mixed with the high-temperature reformed gas, and the resulting mixture is subjected to the self-reforming reaction.

DETAILED DESCRIPTION OF THE INVENTION

In the accompanying drawing, FIG. 1 is a schematic representation of the principle of the method of the invention;

FIG. 5 illustrates another embodiment of the invention.

A characteristic feature of the invention lies in that the whole amount of the gas to be reformed (e.g. natural gas) is not supplied to the reformer furnace which is packed with a catalyst to be heated externally but that the gas is divided into two branch streams; one branch stream gas (the first branch stream gas) is mixed with a part of the reduction furnace exhaust gas and the resulting mixture is subjected to the reforming reaction in the reformer furnace, while the maintaining branch stream gas (the second branch stream gas) is mixed with the high-temperature reformed gas from the reformer furnace and the resulting mixture is self-reformed in an after-reactor packed with a catalyst without external heating.

Figure 1:
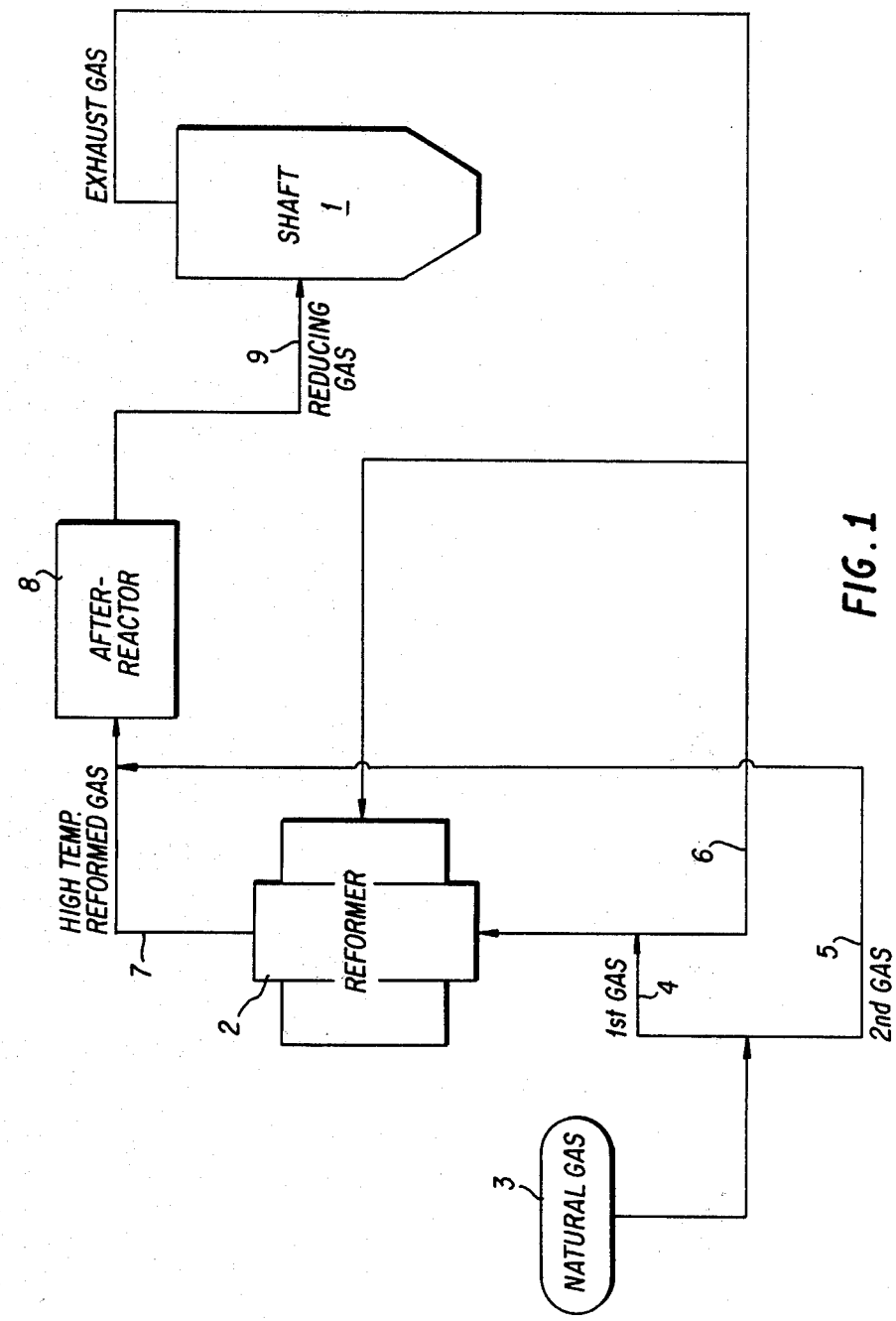
Figure 2:
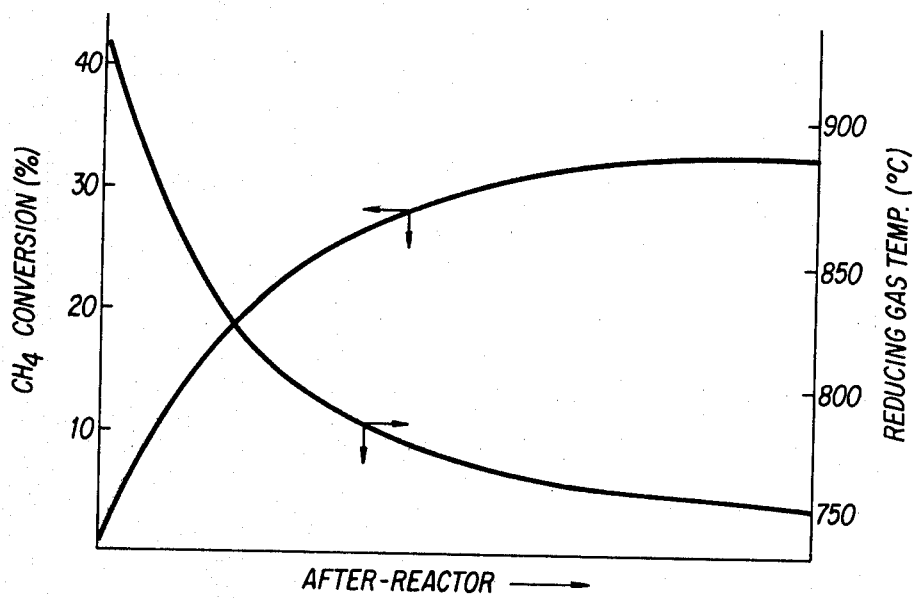
FIG. 2 is a diagram illustrating the progress of the self-reforming reaction in an after-reactor.

FIG. 2 illustrates the progress of the reforming reaction within a catalyst-packed after-reactor. When the high-temperature mixed gas ($CH_4$ 4.9%, CO 28%, $H_2O$ 5.7%, $H_2$ 45%, $N_2$ 10%, temperature: 925° C.) obtained by mixing the high-temperature reformed gas from the reformer furnace with the second branch stream gas (methane gas) was supplied to the after-reactor, about 40% of the $CH_4$ was reformed to CO and $H_2$ and the temperature dropped from 925° C. to about 750° C., in accordance with the reaction behavior as shown in FIG. 2. The reducing gas thus obtained had a good R value of 8 to 13. (The R value $[=(CO+H_2)/(CO_2+H_2O)]$ is representative of the reducing power of the reducing gas.)

As can be seen from FIG. 2, when a mixture of the high-temperature reformed gas and methane is supplied to an after-reactor, self-reforming reactions take place and there can be obtained a cooled and temperature-controlled reducing gas with a sufficient reducing power.

Figure 3:
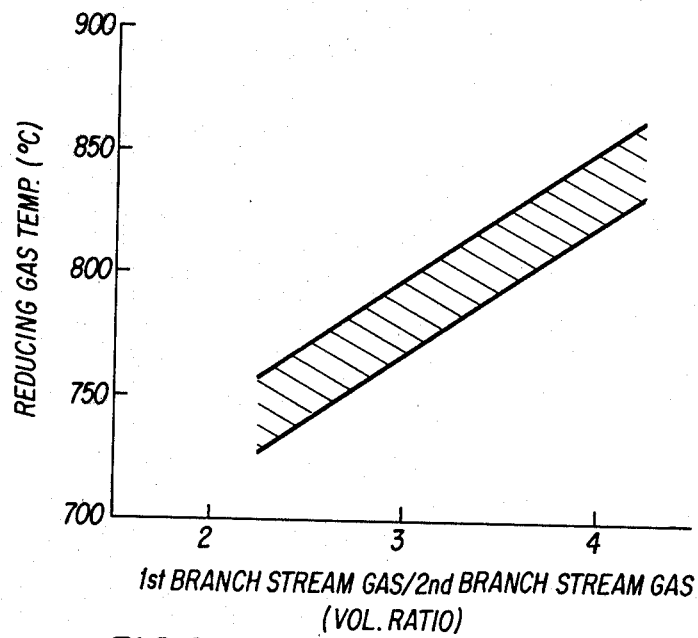
FIG. 3 is a diagram illustrating the relationship between the ratio by volume of the first branch stream gas to the second stream gas and the temperature of the reducing gas obtained.

The distribution ratio in volume of the methane portion to be supplied to the externally heated reformer furnace to the methane portion to be supplied to the after-reactor without external heating is illustrated by the diagram in FIG. 3. As can be seen from FIG. 3, in cases where a reducing gas is to be prepared by supplying a mixture of the first branch stream gas and the reduction furnace exhaust gas to the reformer furnace, mixing the high-temperature reformed gas thus obtained with the second branch stream gas and then supplying the resulting high-temperature gas (at a temperature of 925° C.) to the after-reactor, the higher the ratio in volume of the methane portion supplied to the reformer furnace (i.e. the first branch stream gas) to the methane portion supplied to the after-reactor (i.e. the second branch stream gas) is, or, the smaller the supply of the second branch stream gas is, the smaller the extent of the self-reforming reaction in the after-reactor is. When the above ratio exceeds about 4:1, the temperature of the reducing gas exceeds 850° C. Temperatures exceeding 850° C. are too high for the gases to be blown into a reduction furnace. On the other hand, when the above ratio is less than about 2.5:1, the temperature cannot reach about 740° C. Temperatures lower than 740° C. are inadequate for the gases to be blown into a reduction furnace. Therefore, it is desirable that the ratio in volume of the first branch stream gas to the second branch stream gas be in the range of from 2.5:1 to 4:1.

It is desirable that the mixture of the high-temperature reformed gas and the second branch stream, which is supplied to the after-reactor, have a $CH_4/(CO_2+H_2O)$ volume ratio of 0.5-0.7 and a temperature between 900° C. and 1,000° C. The extent to which the self-reforming reaction can proceed in the after-reactor depends upon the gas composition, especially the volume ratio $CH_4/(CO_2+H_2O)$, and the gas temperature. When the above gas volume ratio is too small and the temperature is too low, the self-reforming reaction cannot proceed to a significant extent. When the above gas volume ratio is too large, the possibility of carbon deposition increases. Higher gas temperatures than 1,000° C. raise the temperature at the outlet from the reformer furnace and cause an excessively heavy load upon the reformer furnace.

If the mixing of the high-temperature reformed gas and the second branch stream gas results in a mixed gas temperature lower than 900° C., the second branch stream gas should preferably be heated to 500°-600° C. prior to the mixing, either by heating or by mixing with a heated reduction furnace exhaust gas. By taking such a measure, the mixture of the high-temperature reformed gas and the second branch stream gas can maintain a high temperature between 900° C. and 1,000° C.

The temperature of the mixed gas decreases as a result of the endothemic self-reforming reaction within the after-reactor. At the same time, the mixed gas turns into a reducing gas suited for blowing into the reducing furnace. Although the extent to which the temperature decreases due to the self-reforming reaction depends upon the amount of the self-reformed gas portion, the temperature can be adjusted to 740°-900° C. However, in some cases, too large a decrease in temperature may result in a temperature lower than the temperature at which the reducing gas should be blown into the reduction furnace. Therefore, it is desirable that the self-reforming reaction be carried out in such a manner that the reducing gas obtained has a temperature near the upper limit of the temperature for blowing into the reduction furnace, for example 800°-850° C.; thereafter, a fine temperature adjustment should be made with a gas cooler or the like. For the purpose of causing cementation and thereby facilitating the melting step in the subsequent steel making process, it is desirable that the reducing gas to be blown into the reduction furnace contain a small amount of residual $CH_4$. In this respect, the self-reforming reaction need not be complete.

Another characteristic feature of the invention lies in that, when the gas mainly composed of methane is divided into two branch streams and the first branch stream gas is supplied to the reformer furnace in admixture with the reduction furnace exhaust gas, the reduction furnace exhaust gas is preliminarily heated to a temperature of 800° C. or above and then mixed with the first branch stream gas so that a mixed gas temperature of 750°-850° C. can be obtained. By taking such a measure, the problem of carbon deposition in the reformer furnace can be avoided.

The components of the above mixed gas are $CH_4$, CO, $H_2$, $H_2O$ and $CO_2$. They are involved in the carbon deposition in a complicated manner. In principle, however, the carbon deposition problem is produced by the reactions:

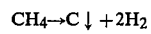

$$CH_4 \rightarrow C\downarrow + 2H_2$$

$$2CO \rightarrow CO_2 + C\downarrow$$

In accordance with the present invention, it is possible to raise the temperature of the mixed gas to 750°-850° C. almost instantaneously by heating the reduction furnace exhaust gas alone to 800° C. and mixing it with the first branch stream gas, so that the mixed gas can pass the temperature region below about 700° C. where the risk of carbon deposition is great and thereby the carbon deposition problem can be eliminated. When the reduction furnace exhaust gas is heated alone, there arises substantially no carbon deposition problem.

The reforming of a natural gas or the like in the reformer furnace is conventionally carried out at a $CH_4/(CO_2+H_2O)$ volume ratio of 0.7–0.8. However, in accordance with the invention, the gas to be reformed is divided into two branch streams and only one of them (the first branch stream gas) is supplied to the reformer furnace, so that the $CH_4/(CO_2+H_2O)$ ratio can be reduced to 0.4–0.65. This means that the possibility of carbon deposition decreases to that extent.

In accordance with another embodiment of the invention, the second branch stream gas is mixed with another part of the reduction furnace exhaust gas and the mixture is then mixed with the high-temperature reformed gas. In this case, the amount of the reduction furnace exhaust gas supplied to the reformer furnace is decreased by that amount of the reduction furnace exhaust gas mixed with the second branch stream gas, and as a result the $CH_4/(CO_2+H_2O)$ volume ratio of the mixed gas supplied to the reformer furnace becomes 0.6–0.8.

The reforming in the reformer furnace involves the reactions:

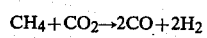

$$CH_4+CO_2\rightarrow 2CO+2H_2$$

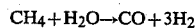

$$CH_4+H_2O\rightarrow CO+3H_2$$

and, as a result thereof, high-temperature reformed gases at 900°–1,000° C. are obtained at the outlet from the reformer furnace.

The present invention is now illustrated with reference to the flow sheets shown in FIGS. 4 and 5.

Figure 4:
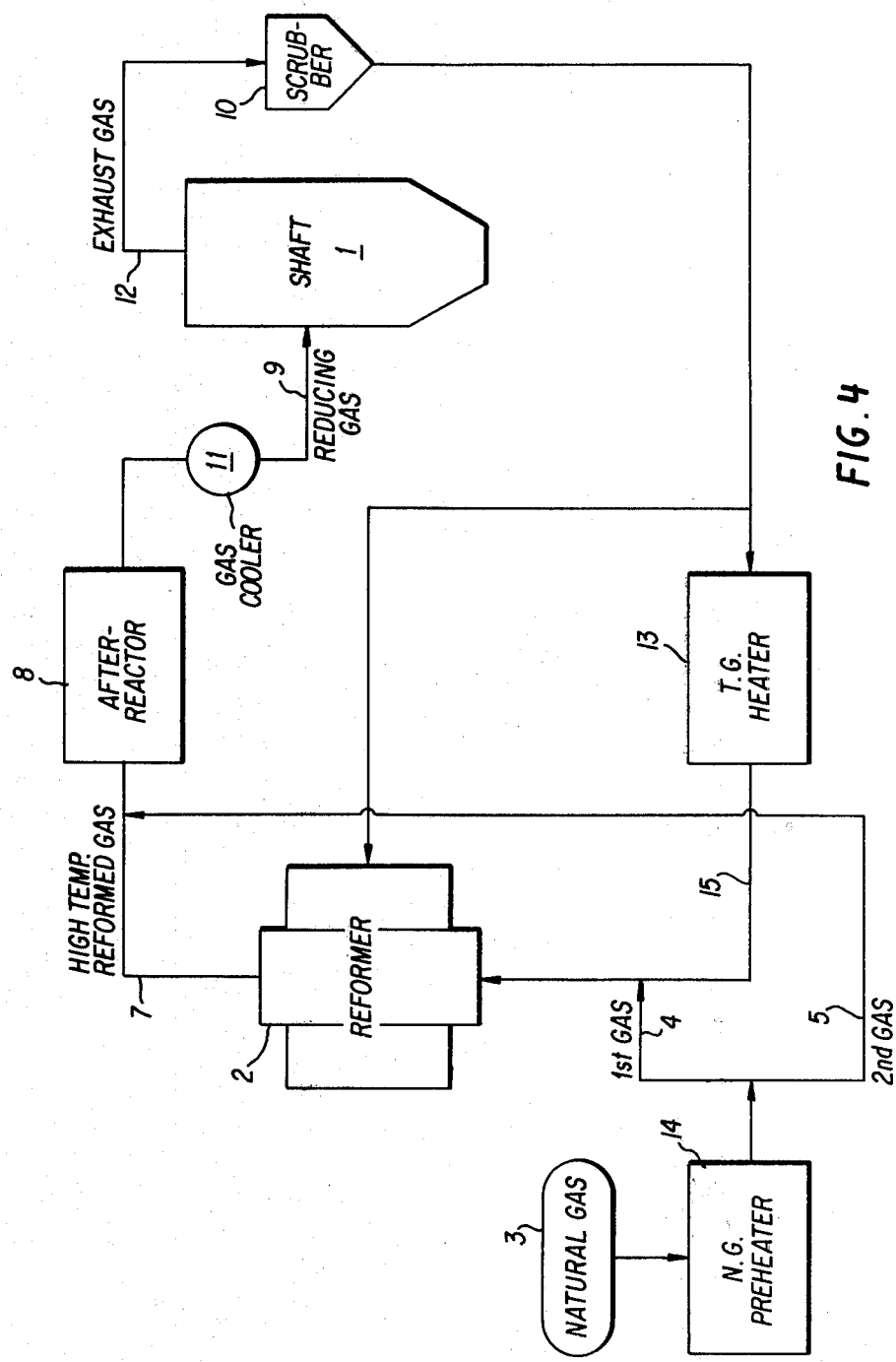
FIG. 4 illustrates an embodiment of the invention.

Referring to FIG. 4, the vertical shaft type reduction furnace (1) is charged with a raw material, such as iron oxide pellets, from the top, while the reducing gas is blown into the furnace at the middle or lower part thereof. The descending raw material and the reducing gas come into contact with each other in a countercurrent manner to cause the reduction of iron oxide to proceed. The reduced, sponge-like metallic iron is discharged from the lower part of the furnace.

The reducing gas after consumption in the reduction of iron oxide is discharged as the reduction furnace exhaust gas (12) from the upper part of the reduction furnace and cooled, deprived of dust and dehumidified in the scrubber (10). The reduction furnace exhaust gas contains $H_2O$ and $CO_2$ each formed by the reduction reactions.

The reduction furnace exhaust gas, except for the portion thereof to be used as a fuel for heating the reformer furnace (2), is passed through the exhaust gas heater (13) and thereby heated to about 800° C. On the other hand, the natural gas (3) to be reformed is preheated to 500°–600° C. in the natural gas preheater (14) and then divided into two branch streams. One of them, i.e. the first branch stream gas, which accounts for about ⅔ of the whole natural gas, is rapidly mixed with the above heated reduction furnace exhaust gas (15) just under the reformer furnace, and the mixture is supplied to the reformer furnace (2) packed with an externally heated catalyst. The $CH_4/(CO_2+H_2O)$ ratio of the mixed gas supplied to the reformer furnace is 0.5–0.6.

The reforming in the reformer furnace is carried out with the $CO_2$ and $H_2O$ as the oxidizing agents, the reformer furnace inlet temperature being 750°–800° C. and the reformer furnace outlet temperature being 900°–950° C. The reactions in the reformer furnace produce the high-temperature reformed gas (7) having a temperature of 900°–950° C. Since the mixed gas to be reformed has a relatively low $CH_4/(CO_2+H_2O)$ ratio, the high-temperature reformed gas still contains a little less than 10% of $CO_2$ and $H_2O$.

The high-temperature reformed gas (7) is then mixed with the second branch stream gas (5), which accounts for the remaining about ⅓ of the natural gas other than the ⅔ portion supplied to the reformer furnace (2). The resulting high-temperature mixed gas has a $CH_4/(CO_2+H_2O)$ ratio of about 0.7. The high-temperature mixed gas is supplied to the after-reactor (8) packed with a catalyst without external heating. The self-reforming takes place in the after-reactor, and as a result a reducing gas is formed which has a decreased temperature of about 800° C. This reducing gas has a favorable R value $[(CO+H_2)/(CO_2+H_2O)]$ of not less than 10. (The R value is indicative of the reducing power of the reducing gas.) $CH_4$ remains in this gas in an amount of 3–6%. It is also possible to adjust the temperature of the reducing gas by passing it through the gas cooler (11) prior to blowing it into the reduction furnace (1) so as to fit the reducing gas to the conditions of operation of the reduction furnace.

Referring to FIG. 5, the process shown in FIG. 3 is basically the same as that in FIG. 4 but is different therefrom in that the second branch stream gas, prior to the supply thereof to the high-temperature reformed gas, is mixed with a portion of the reduction furnace exhaust gas to be supplied to the reformer furnace.

Thus, a mixture of the first portion (first branch stream gas) of the natural gas and a portion of the reduction furnace exhaust gas is supplied to the reformer furnace. As a result of the decrease in the amount of the reduction furnace exhaust gas supplied, the $CH_4/(CO_2+H_2O)$ ratio of the mixed gas becomes about 0.7. The high-temperature reformed gas (7) formed in the reformer furnace is higher in reducing power as compared with the process shown in FIG. 4. To this high-temperature reformed gas is supplied the mixed gas composed of the above-mentioned second branch stream gas and the reduction furnace exhaust gas.

What is claimed is:

1. In a process for the direct reduction of iron oxide by blowing into a reduction furnace a reducing gas which is prepared by reforming a mixture of a reduction furnace exhaust gas and a gas mainly composed of methane, the improvement which comprises the steps of:
(a) dividing the gas mainly composed of methane into two branch streams;
(b) mixing the first branch stream gas with a part of the reduction furnace exhaust gas and supplying the resulting mixture to the externally heated reformer furnace, to produce a high-temperature reformed gas;
(c) mixing the second branch stream gas with said high-temperature reformed gas, thereby forming a gas mixture having a $CH_4/(CO_2+H_2O)$ volume ratio of 0.5–0.7, and, during the course to the reduction furnace, subjecting the mixture to endothermic reforming reactions in an after-reactor without external heating, utilizing the sensible heat of the high-temperature mixed gas;
(d) controlling the self-reforming reactions so as to lower the temperature and simultaneously adjust the composition of the high-temperature mixed gas; and
(e) blowing the reducing gas obtained into the reduction furnace.

2. The process of claim 1, wherein, in step (b), said part of the reduction furnace exhaust gas is preliminarily heated to 800° C. or above and the first branch stream gas is mixed therewith so that the mixed gas can have a temperature of 750°-850° C.

3. The process of claim 1, wherein, in step (b), said part of the reduction furnace exhaust gas is preliminarily heated to 800° C. or above and the first branch stream gas is mixed therewith so that the mixed gas can have a temperature of 750°-850° C.; and, in step (c), the second branch stream gas is mixed with another part of the reduction furnace exhaust gas and the mixture is then mixed with the high-temperature reformed gas coming out of the reformer furnace.

4. The process of claim 1, 2 or 3, wherein, in step (a), the gas mainly composed of methane is a natural gas.

5. The process of claim 1, 2 or 3, wherein, in step (a), the volume ratio of the first branch stream gas to the second branch stream gas is from 2.5:1 to 4:1.

6. The process of claim 1, or 2, wherein, in step (b), the $CH_4/(CO_2+H_2O)$ volume ratio of the mixed gas supplied to the reformer furnace is from 0.4 to 0.65.

7. The process of claim 1, or 3, wherein, in step (b), the $CH_4/(CO_2+H_2O)$ volume ratio of the mixed gas supplied to the reformer furnace is from 0.6 to 0.8.

8. The process of claim 1 or 2, wherein, in step (b), the temperature of the mixed gas supplied to the reformer furnace is 750°-850° C.

9. The process of claim 1, 2 or 3, wherein, in step (c), the temperature of the high-temperature reformed gas at the outlet of the reformer furnace is 900°-1,000° C.

10. The process of claim 1, 2 or 3, wherein, in step (d), the temperature of the high-temperature mixed gas is 900°-1,000° C.

11. The process of claim 1, 2 or 3, wherein, in step (e), the reducing gas has a $(H_2+CO)/(H_2O+CO_2)$ volume ratio of 8-13 and contains $CH_4$ in an amount of 3-6% by volume.

12. The process of claim 1, 2 or 3, wherein, in step (e), the temperature of the reducing gas is 740°-900° C.

* * * * *

UNITED STATES PATENT AND TRADEMARK OFFICE
CERTIFICATE OF CORRECTION

PATENT NO. : 4,348,226
DATED : September 7, 1982
INVENTOR(S) : Aoki et al

It is certified that error appears in the above—identified patent and that said Letters Patent is hereby corrected as shown below:

Column 2, line 19, change "temperture" to --temperature--;

line 36, change "705°" to --750°--.

Column 3, line 2, change "maintaining" to --remaining--.

Signed and Sealed this

Twenty-second Day of March 1983

[SEAL]

Attest:

GERALD J. MOSSINGHOFF

Attesting Officer  Commissioner of Patents and Trademarks